July 14, 1959 N. TATTERSALL 2,894,609
MOTOR VEHICLE DRIVING GEAR
Filed Oct. 14, 1953 2 Sheets-Sheet 1

INVENTOR
Norman Tattersall
BY
ATTORNEY

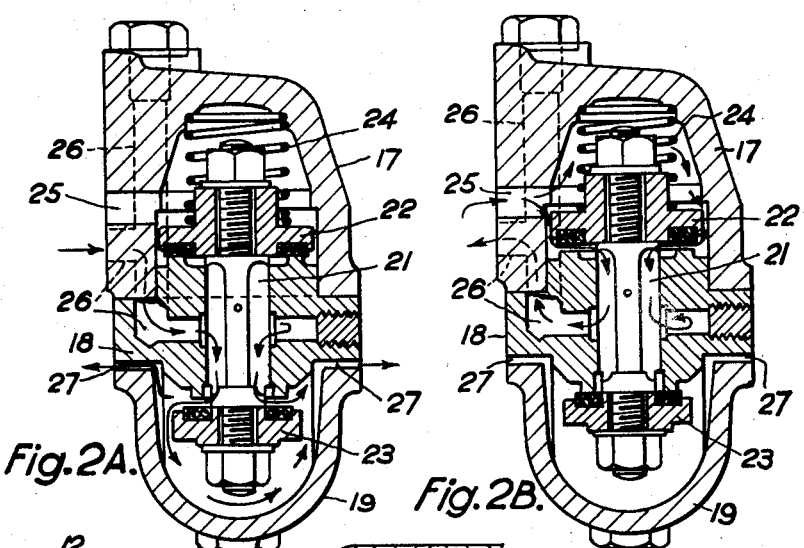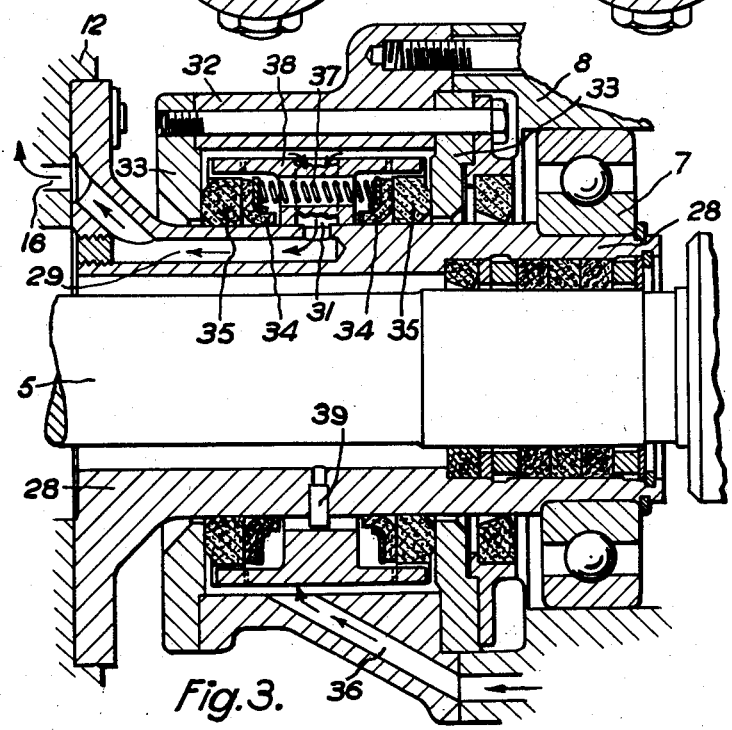

United States Patent Office 2,894,609
Patented July 14, 1959

2,894,609

MOTOR VEHICLE DRIVING GEAR

Norman Tattersall, Leyland, England, assignor to Leyland Motors Limited, London, England, a British company Application October 14, 1953, Serial No. 386,069

2 Claims. (Cl. 192—3.2)

It is a usual practice to transmit the drive of a motor vehicle through a hydraulic coupling or fluid flywheel, and this arrangement has been found of particular advantage in vehicles which must frequently stop, such as public omnibuses. But the presence of this coupling increases the fuel consumption of the vehicle, because of the slip in the coupling.

To reduce loss of energy from this cause the present invention provides for automatically locking the fluid coupling above a certain speed and for automatically unlocking it at a suitably lower speed, so that the coupling is operative during stopping and starting when it is most valued and is out of action at other times.

For this purpose the invention provides a friction clutch the parts of which are secured to the driving and driven members of the coupling respectively, and operates the clutch by a governor-controlled pneumatic servo-motor.

It is plainly convenient to combine the clutch structurally with the coupling. The invention also provides for combining the servo-motor structurally with the clutch, by the use of a diaphragm as the clutch operating means. A separate centrifugal governor is made unnecessary by using to control the servo-motor a valve mechanism rotating with one part of the clutch and placed excentrically so that it opens and closes under the action of centrifugal force and an opposing bias to cause the clutch to lock the coupling at high speeds. This arrangement raises the subsidiary problem of connecting a fixed air reservoir with the rotating valve and servo-motor.

A convenient construction of motor vehicle driving gear embodying the invention is shown in the accompanying drawings in which—

Figures 2A and 2B are axial sections through the valve mechanism showing it in different positions and Figure 3 an axial section through a rotary seal through which the air connection is made from the air reservoir to the rotating parts.

Figure 1:
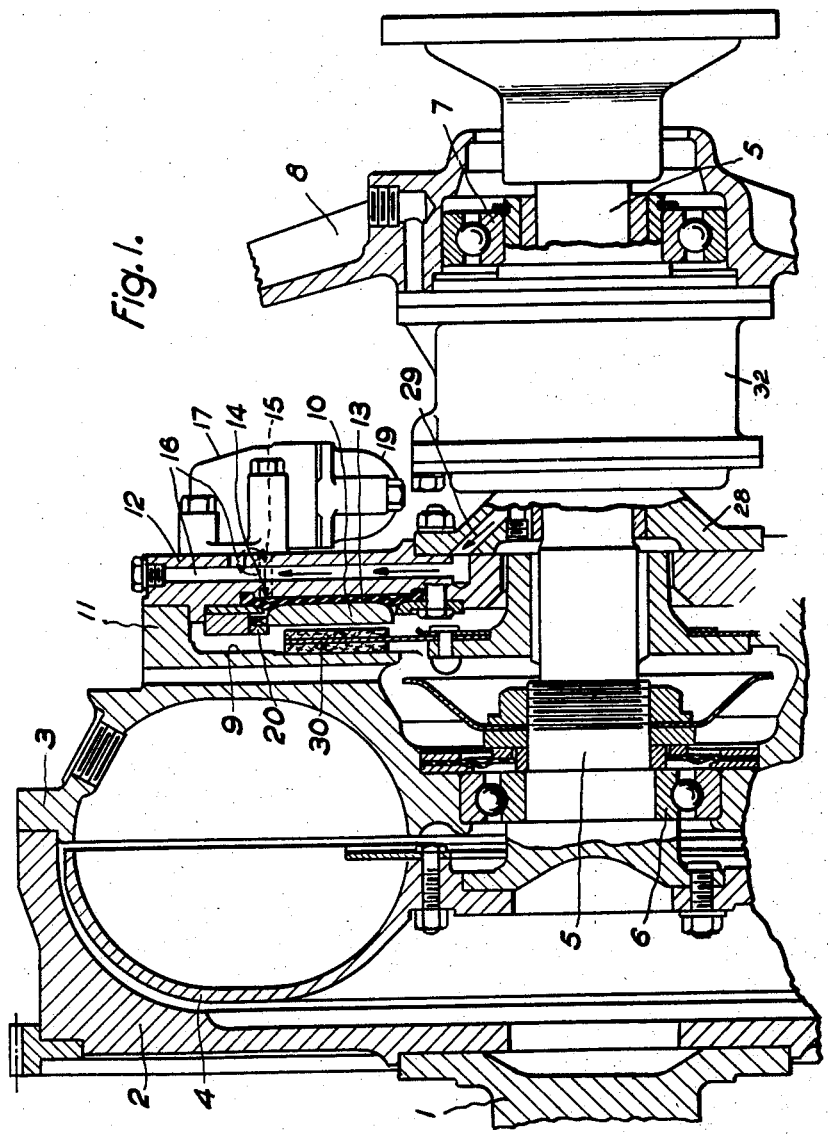
Figure 1 is an elevation of the gear mainly in axial section, with a part broken away.

The engine shaft 1 drives the two part housing 2, 3, of a hydraulic coupling, the driven part 4 of which is attached to the driven shaft 5. The part 3 supports a bearing 6 for the driven shaft and is itself carried in a bearing 7 in a stationary frame member 8.

Upon the housing part 3 there is a flat annular friction surface 9 at right angles to the shaft 5 surrounded by a flange 11. To the flange is fastened a tunnelled annulus 12 which with the surface 9 and flange 11 completes a housing for the clutch and its servo-motor. The servo-motor is constituted by an annular diaphragm 13, the inner and outer edges of which are clamped upon the tunnelled annulus 12. The diaphragm has preferably one or more annular grooves or corrugations 14 beneath which there opens a transverse tunnel 15 by which air passes from the valve to the diaphragm. A radial tunnel 16 with lateral branches makes connection between the valve and the rotary seal through which air is supplied from a reservoir not shown. A pressure plate 10 covers the face of the diaphragm and the drive is directly transmitted to this through teeth 20. Between the parts 9 and 10 is a driven clutch disc 30 splined upon the shaft 5.

The valve mechanism is secured upon the outer face of the tunnelled annulus 12 at a convenient distance from the axis of the shaft to give rise to an adequate centrifugal force. As best seen in Figure 2 the mechanism comprises a three part housing 17, 18, 19 and the middle part 18 has a valve seat on its upper surface and another on its lower surface. In a central bore in the part 18 there slides the common stem 21 of two valves 22 and 23; the stem is non-circular to permit passage of air through the bore. A light spring 24 bears upon the valve 22, holding it closed and the valve 23 open. A horizontal passage 25 through part 17 connects the space above valve 22 to the tunnel 16 in the annulus 12; a vertical passage 26 with horizontal branches connects the central bore of the part 18 with the tunnel 15 in the annulus 12. Openings 27 in the part 19 serve as exhaust passages.

The rotary seal through which air is supplied from the reservoir to the valve and clutch is seen in Figure 3 to be built upon the hub 28 of the coupling housing 2, 3. A tunnel 29 in the hub connects with the tunnel 16 and opens upon the outer surface of the hub at 31. A casing 32 attached to the frame member 8 surrounds the hub 28 and carries end rings 33 extending inward toward the hub. Hat leathers 34 and packing rings 35 make a substantially air-tight joint with the rings 33 and with the hub 28 on each side of the opening 31. A tunnel 36 provides the air connection to the reservoir. The hat rings are pressed apart by springs 37 carried in a sleeve 38, which is pinned to the hub 28 at 39, and by its notched ends engaging the packing rings 35 so that they turn with the hub.

When the engine is running and air pressure is available, the valve 22 is held closed as seen in Fig. 2A by air pressure as well as by the spring 24, the clutch 9, 10, 30 is disengaged and the coupling 2, 3, 4, is operative. When the vehicle has attained a substantial speed centrifugal force upon the valves 22, 23 overcomes the air pressure and the spring 24, valve 22 opens and valve 23 closes as seen in Fig. 2B. Air under pressure is then admitted to the diaphragm 13 as indicated by the arrows in Fig. 2B by way of 36, 31, 29, 16, 25, valves 22, 26 and 15, the clutch parts 9, 10, 30 are pressed together and the drive from shaft 1 to shaft 5 is taken up by the clutch, the coupling 2, 3, 4 being locked solid. When the vehicle slows down, valve 22 closes, valve 23 opens, and the air between the diaphragm 10 and tunnelled annulus 12 escapes through 15, 26, valve 23 and 21 as indicated by the arrows in Fig. 2A.

I claim:

1. In a motor road vehicle transmission gear the combination of a driving shaft, a housing for a fluid coupling fast upon said shaft, forming the driving part of said coupling and presenting an external friction surface and a flange surrounding said surface, a tunnelled annulus attached to said flange, an annular diaphragm clamped on the inner face of said annulus covering an opening of a tunnel in said annulus, a pressure plate carried by said diaphragm, a driven shaft, a fluid coupling driven part upon said driven shaft within said housing, a driven friction clutch part upon said driven shaft located between said friction surface of the coupling housing and said pressure plate, and a valve structure mounted eccentrically upon the outer face of said tunnelled annulus operating under centrifugal force to admit air through said annulus to said diaphragm to cause said driven friction clutch part to be gripped between said friction surface of the housing and said pressure plate.

2. In a motor road vehicle transmission gear the combination with a driving shaft, a co-axial driven shaft, a fluid coupling constituting a driving connection between said shafts and comprising a housing and driving part secured to said driving shaft and a driven part within said housing secured to said driven shaft, of a friction clutch comprising a flat friction surface upon said housing, an annulus secured to said housing and axially spaced from said friction surface, a pressure plate positively driven by said annulus and axially movable between said annulus and the friction surface upon said housing, a driven clutch disc secured to said driven shaft and located between said pressure plate and said friction surface, a diaphragm clamped on said annulus between it and the pressure plate, a valve housing attached to said annulus at a distance from the axis of the shaft, and means for supplying air under pressure between said annulus and said diaphragm and releasing the air whereby to force said pressure plate towards said friction surface and to free it, said means comprising spring-loaded valves of different area upon a common stem set radially with respect to said shafts each having a seat in said valve housing, the larger valve opening radially outward and admitting air between annulus and diaphragm, the smaller opening radially inward and allowing escape of air so admitted, whereby said clutch disc is frictionally driven when the driven shaft attains a predetermined speed and is released at a lower speed.

References Cited in the file of this patent

UNITED STATES PATENTS

| | | |
|---|---|---|
| 2,144,074 | Maybach | June 17, 1939 |
| 2,226,801 | Black | Dec. 31, 1940 |
| 2,351,483 | Carnagua | June 13, 1944 |
| 2,354,174 | Schmitter | July 18, 1944 |
| 2,453,811 | Pennington | Nov. 16, 1948 |
| 2,620,684 | McFarland | Dec. 9, 1952 |
| 2,620,814 | Hobbs | Dec. 9, 1952 |
| 2,646,150 | Hobbs | July 21, 1953 |
| 2,652,730 | Newcomb | Sept. 22, 1953 |
| 2,772,897 | Shaw et al. | Dec. 4, 1956 |
| 2,793,726 | Jandasek | May 28, 1957 |

FOREIGN PATENTS

| | | |
|---|---|---|
| 407,337 | Great Britain | Mar. 12, 1934 |
| 637,351 | Great Britain | May 17, 1950 |